(12) United States Patent
Tseng

(10) Patent No.: US 12,051,330 B2
(45) Date of Patent: Jul. 30, 2024

(54) VEHICLE WARNING SYSTEM

(71) Applicant: Yin-Yan Tseng, Kaohsiung (TW)

(72) Inventor: Yin-Yan Tseng, Kaohsiung (TW)

( * ) Notice: Subject to any disclaimer, the term of this patent is extended or adjusted under 35 U.S.C. 154(b) by 64 days.

(21) Appl. No.: 17/988,436

(22) Filed: Nov. 16, 2022

(65) Prior Publication Data

US 2023/0169863 A1   Jun. 1, 2023

(30) Foreign Application Priority Data

Dec. 1, 2021   (TW) .................................. 110144916

(51) Int. Cl.
*G08G 1/16*   (2006.01)
*G06T 7/20*   (2017.01)
*G06T 7/70*   (2017.01)
*G06V 20/54*   (2022.01)

(52) U.S. Cl.
CPC ............. *G08G 1/16* (2013.01); *G06T 7/20* (2013.01); *G06T 7/70* (2017.01); *G06V 20/54* (2022.01); *G06T 2207/10016* (2013.01); *G06T 2207/10032* (2013.01); *G06T 2207/30232* (2013.01); *G06T 2207/30236* (2013.01)

(58) Field of Classification Search
CPC ...... G08G 1/16; G08G 1/0116; G08G 1/0133; G08G 1/0141; G08G 1/04; G08G 1/166; G06T 7/20; G06T 7/70; G06T 2207/10016; G06T 2207/10032; G06T 2207/30232; G06T 2207/30236; G06V 20/54; G06V 2201/08; B60W 2520/10; B60W 2554/4042; B60W 30/095; B60W 50/14
USPC ....................................................... 340/436
See application file for complete search history.

(56) References Cited

U.S. PATENT DOCUMENTS

| | | | |
|---|---|---|---|
| 9,761,131 B2 * | 9/2017 | Robinson | G08G 1/0145 |
| 10,769,457 B1 * | 9/2020 | Diehl | G06V 20/58 |
| 11,654,771 B1 * | 5/2023 | Chang | B60K 35/00 345/7 |
| 11,926,318 B2 * | 3/2024 | Bravi | G06V 20/58 |

(Continued)

FOREIGN PATENT DOCUMENTS

| | | |
|---|---|---|
| CN | 1916991 A | 2/2007 |
| CN | 106627574 A | 5/2017 |

(Continued)

OTHER PUBLICATIONS

Taiwanese Office Action mailed Aug. 2, 2022 for Taiwanese Patent Application No. 110144916, 5 pages.

*Primary Examiner* — Omar Casillashernandez
(74) *Attorney, Agent, or Firm* — Demian K. Jackson; Jackson IPG PLLC

(57) ABSTRACT

A vehicle warning system includes a data processor, an image processor and an estimation unit. The data processor receives a first movement data of a first vehicle to generate a first predicted travel path and receives a second movement data of a second vehicle to generate a second predicted travel path. The image processor collects image(s) from at least one video device located within a predetermined area where the first predicted travel path passes and generates the second movement data. The estimation unit receives the first and second predicted travel paths and estimates whether the first and second travel paths are intersected and whether the first vehicle will collide with the second vehicle owing to path intersection.

12 Claims, 3 Drawing Sheets

(56) References Cited

U.S. PATENT DOCUMENTS

2017/0232918 A1* 8/2017 Sancricca ............. B60R 21/013
                                                                                             701/45
2022/0058399 A1* 2/2022 Neser ........................ G06T 7/20

FOREIGN PATENT DOCUMENTS

| | | |
|---|---|---|
| CN | 108177654 A | 6/2018 |
| CN | 112896190 A | 6/2021 |
| CN | 113479219 A | 10/2021 |
| TW | M431390 U | 6/2012 |
| TW | 201437985 A | 10/2014 |

* cited by examiner

VEHICLE WARNING SYSTEM

FIELD OF THE INVENTION

This invention relates to a warning system which can be installed in a vehicle (e.g. car, scooter, motorcycle and bike) or a portable electronic (e.g. smartphone, tablet and smartwatch) and provided to warn the vehicle's driver before a possible collision.

BACKGROUND OF THE INVENTION

A navigator with global positioning system (GPS) is usually installed in a vehicle, like as car, scooter, motorcycle or bike, and used to track the vehicle's travel path or navigate the vehicle. However, the conventional navigator cannot predict possible vehicle collision, and cannot warn the vehicle' driver early to avoid traffic accident.

SUMMARY

One object of the present invention is to provide a vehicle warning system which can predict vehicle travel path and estimate whether a vehicle collision caused by travel path intersection will happen. Using the vehicle warning system of the present invention, the vehicle's driver can change driving direction or reduce driving speed beforehand to avoid traffic accident.

A vehicle warning system of the present invention includes a data processor, an image processor, and an estimation unit. The data processor is provided to receive a first movement data of a first vehicle and generate a first predicted travel path of the first vehicle in an electronic map database, the first movement data includes a first movement speed of the first vehicle. The image processor is provided to receive an image captured from a video of one of a plurality of video devices installed in a predetermined area where the first predicted travel path passes. A second vehicle and a fixed object are captured in the image. The image processor is provided to generate a second movement data of the second vehicle according to the image, the second movement data includes a second movement speed of the second vehicle. The data processor is provided to receive the second movement data of the second vehicle and generate a second predicted travel path of the second vehicle in the electronic map database. The estimation unit is provided to receive the first and second predicted travel paths, estimate whether the first and second predicted travel paths are intersected and estimate whether the first vehicle moving in the first movement speed along the first predicted travel path will collide with the second vehicle moving in the second movement speed along the second predicted travel path while the first and second predicted travel paths are estimated to be intersected.

In the present invention, the data processor is provided to receive the first movement data of the first vehicle and the second movement data of the second vehicle and generate the first predicted travel path of the first vehicle and the second predicted travel path of the second vehicle, the image processor is provided to generate the second movement data of the second vehicle using the image(s) from the video device(s) installed in the predetermined area where the first predicted travel path passes, and the estimation unit is provided to estimate whether the first and second predicted travel paths will be intersected and estimate whether the first vehicle will collide with the second vehicle owing to travel path intersection. Accordingly, the vehicle warning system of the present invention can protect the first vehicle from the traffic accident.

DETAILED DESCRIPTION OF THE INVENTION

Figure 1:
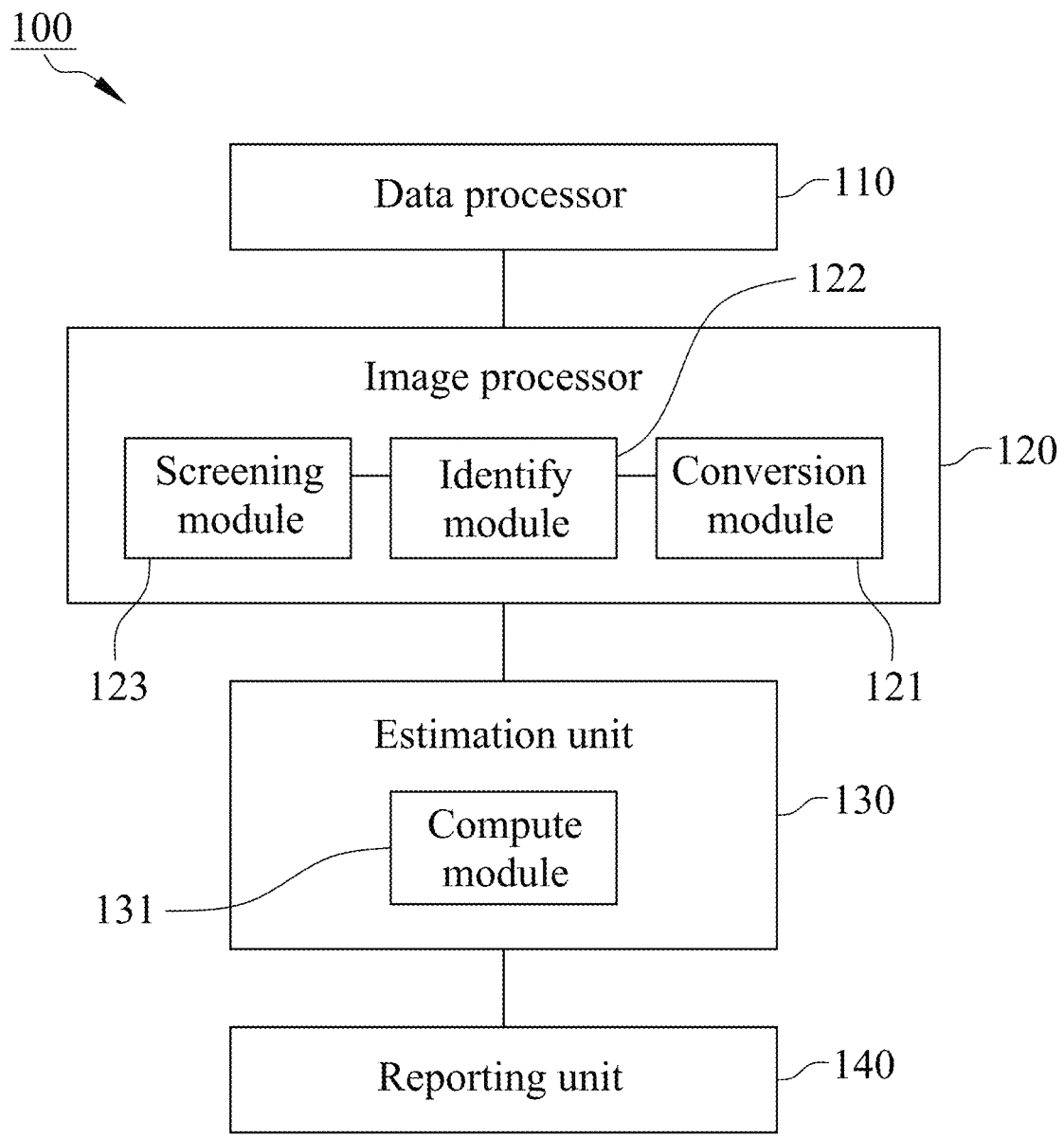
FIG. 1 is a block diagram illustrating a vehicle warning system in accordance with one embodiment of the present invention.

With reference to FIG. 1, a vehicle warning system 100 of the present invention can be installed in a navigation software of a vehicle (e.g. car, scooter, motorcycle and bike) or a portable electronic (e.g. smartphone, tablet and smartwatch) and used to estimate whether a collision will occur resulted from vehicle's travel path intersection. The vehicle warning system 100 includes a data processor 110, an image processor 120 and an estimation unit 130. And preferably, the vehicle warning system 100 further includes a reporting unit 140.

Figure 2:
FIG. 2 is a diagram showing a predicted travel path used in a vehicle warning system in accordance with one embodiment of the present invention.

With reference to FIGS. 1 and 2, the data processor 110 is provided to receive a first movement data of a first vehicle A1 and a second movement data of at least one second vehicle A2. In this embodiment, the first vehicle A1 and the second vehicle A2 are driven by different drivers. A first predicted travel path A11 of the first vehicle A1 and a second predicted travel path A21 of the second vehicle A2 can be generated in an electronic map database, such as Google map, by the data processor 110 based on the first movement data of the first vehicle A1 and the second movement data of the second vehicle A2. Preferably, the first movement data includes a first movement direction and a first movement speed of the first vehicle A1, and the second movement data includes a second movement direction and a second movement speed of the second vehicle A2. The first movement direction is changed with at least one first turning angel of the wheel of the first vehicle A1, the first movement direction or the first turning angel is obtained according to a first position coordinate of the first vehicle A1, and the first position coordinate of the first vehicle A1 is changed when the first vehicle A1 is moved. Preferably, the first position coordinate of the first vehicle A1 is derived from a positioning system, and in this embodiment, the first position coordinate is a GPS (global positioning system) coordinate of the first vehicle A1. The second movement direction is changed with at least one second turning angel of the wheel of the second vehicle A2, and the second movement direction or the second turning angel is obtained according to a second position coordinate of the second vehicle A2. The first predicted travel path A11 is generated by the data processor 110 based on the first movement direction of the first vehicle A1, and the second predicted travel path A21 is generated by the data processor 110 based on the second movement direction of the second vehicle A2.

Figure 3:
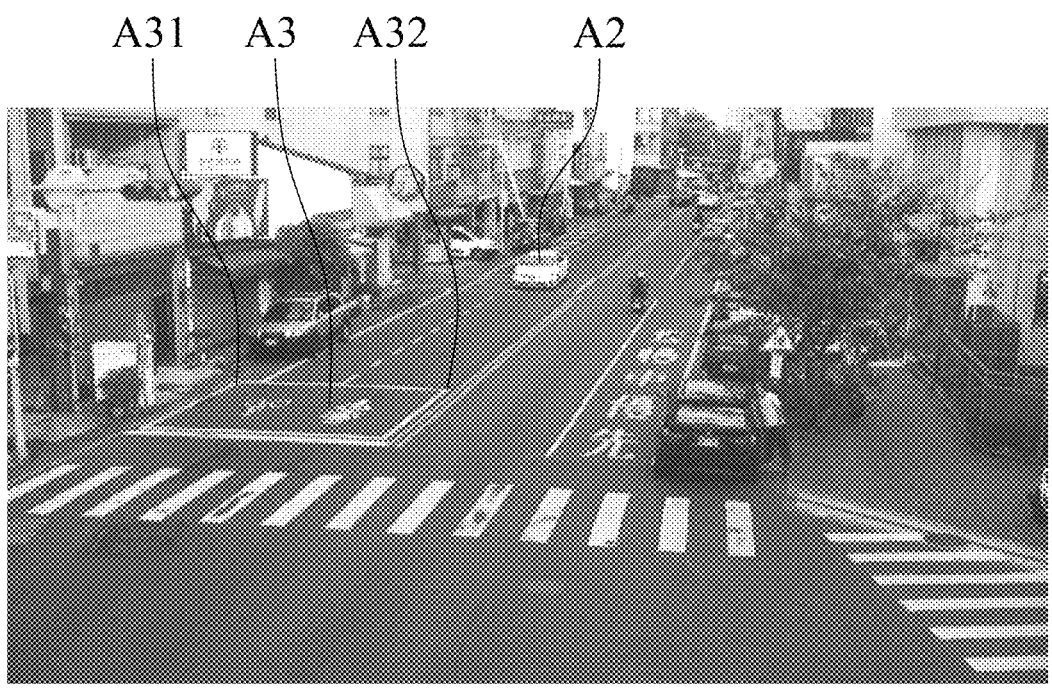
FIG. 3 is an image used in a vehicle warning system in accordance with one embodiment of the present invention.

With reference to FIGS. 1 to 3, the image processor 120 is provided to receive image(s) of a video as shown in FIG. 3 from a video device (not shown), such as video camera of a real-time monitoring system or traffic monitoring system, the video device is installed in a predetermined area A12 where the first predicted travel path A11 passes. The predetermined area A12 is adjusted while the first vehicle A1 is moved. In this embodiment, the image processor 120 includes a screening module 123 which is used to screen all video devices located within the predetermined area A12 and select the image(s) showing the first predicted travel path A11 from one of the video devices based on installation positions and directions of the video devices. Referring to FIG. 3, the second vehicle A2 and at least one fixed object A3 are captured in the images, and the images are changed while the second vehicle A2 is moved. The second movement data of the second vehicle A2 can be obtained after processing the images using the image processor 120. Preferably, the fixed object A3 is, but not limit to, a roadside parking space or a two-stage left turn box at an intersection.

Figure 4:
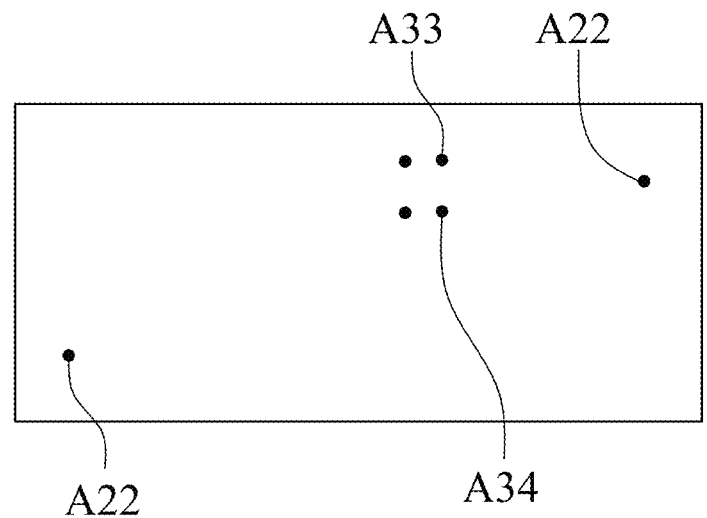
FIG. 4 is an aerial view used in a vehicle warning system in accordance with one embodiment of the present invention.
Figure 5:
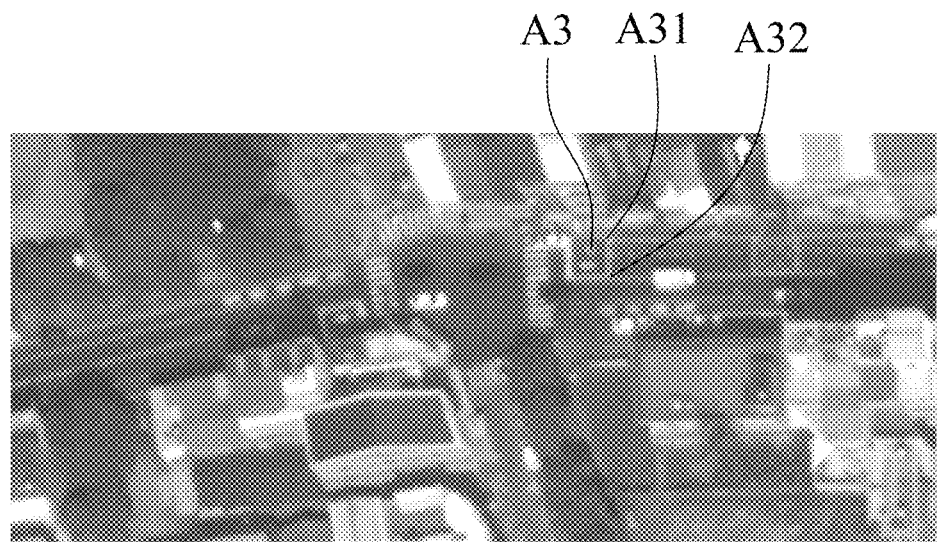
FIG. 5 is an aerial photo used in a vehicle warning system in accordance with one embodiment of the present invention.

With reference to FIGS. 1 to 4, the image processor 120 further includes a conversion module 121 which is used to convert the image as shown in FIG. 3 to an aerial view as shown in FIG. 4, and the conversion module 121 may be an OpenCV (open source computer vision library) module. The image processor 120 selects an aerial photo as shown in FIG. 5 corresponding to the area captured in the image from an aerial photo database such as Google map. The fixed object A3 is shown in the aerial photo, and a coordinate set of the fixed object A3 can be derived from a coordinate system (e.g. googlemaps url_link) of the aerial photo database. In this embodiment, the coordinate set is embedded in the aerial view by the image processor 120 and provided to calculate the second position coordinate of the second vehicle A2 in the aerial view so as to obtain the second movement data of the second vehicle A2. The coordinate set is not shown in the aerial photo as shown in FIG. 5 or the aerial view as shown in FIG. 4. Preferably, the image processor 120 further includes a identify module 122 which is provided to identify the second vehicle A2 is what type of vehicle, and the identify module 122 may be the real-time object detection algorithm YOLOv4.

Referring to FIG. 3, the fixed object A3 in the image has a first end A31 and a second end A32 in this embodiment, and there is a first coordinate corresponding to the first end A31 and a second coordinate corresponding to the second end A32 in the coordinate set from the image database. With reference to FIG. 4, there are a moving dot A22 used to represent the second vehicle A2, a first fix dot A33 used to represent the first end A31 of the fixed object A3 and a second fix dot A34 used to represent the second end A32 of the fixed object A3 shown in the aerial view, the moving dot A22 is moved while the second vehicle A2 is moved. The image processor 120 records the first coordinate of the first end A31 and the second coordinate of the second end A32 at the first fix dot A33 and the second fix dot A34 in the aerial view respectively, calculates a first distance from the first end A31 to the second end A32 using the pixels of the aerial photo, and calculates a second distance from the moving dot A22 to one of the first fix dot A33 and the second fix dot A34 based on the first distance to obtain the second position coordinate of the second vehicle A2. Similarly, the second position coordinate is changed as the second vehicle A2 is moved, and the data processor 110 computes the second movement speed of the second vehicle A2 using the second position coordinate of the second vehicle A2 and one of the first coordinate of the first end A31 of the fixed object A3 and the second coordinate of the second end A32 of the fixed object A3.

With reference to FIG. 1, the estimation unit 130 is provided to receive the first predicted travel path A11 of the first vehicle A1 and the second predicted travel path A21 of the second vehicle A2, estimate whether the first predicted travel path A11 and the second predicted travel path A21 are intersected, and estimate whether the first vehicle A1 driven in the first movement speed along the first predicted travel path A11 will collide with the second vehicle A2 driven in the second movement speed along the second predicted travel path A21 owing to path intersection.

Referring to FIG. 1, the estimation unit 130 includes a compute module 131 which is used to compute a predicted contact time between the first vehicle A1 moving in the first movement speed along the first predicted travel path A11 and the second vehicle A2 moving in the second movement speed along the second predicted travel path A21. Preferably, the compute module 131 further computes a braking distance of the first vehicle A1 in relation to the second vehicle A2 required to stop the first vehicle A1 before the predicted contact time.

With reference to FIG. 1, if the estimation unit 130 estimates the first vehicle A1 will collide with the second vehicle A2 and the braking distance will be not enough, the reporting unit 140 sends a reporting signal to the first vehicle A1 or the portable electronic located in the first vehicle A1 to warn the driver of the first vehicle A1. The reporting signal includes the information of one or more than one of type of the second vehicle A2, the second movement speed of the second vehicle A2, crossing point of the first predicted travel path A11 and the second predicted travel path A21, the predicted contact time and a notice of insufficient braking distance. The warning sign may be noise, light, image or video. While one of the first predicted travel path A11, the first movement direction, the first movement speed of the first vehicle A1, the second predicted travel path A21, the second movement direction, the second movement speed of the second vehicle A2 is changed to allow the estimation unit 130 to estimate the first vehicle A1 will not collide with the second vehicle A2, the reporting unit 140 stops sending the reporting signal.

With reference to FIG. 1, the image processor 120 is provided to collect the images from the video devices installed in the predetermined area A12 where the first predicted travel path A11 passes so as to obtain the second movement data of the second vehicle A2, and the estimation unit 130 is provided to estimate whether the first predicted travel path A11 and the second predicted travel path A21 are intersected and whether the collision of the first vehicle A1 with the second vehicle A2 will happen due to travel path intersection, thus the vehicle warning system 100 of the present invention is helpful to avoid vehicle accident early.

While this invention has been particularly illustrated and described in detail with respect to the preferred embodiments thereof, it will be clearly understood by those skilled in the art that is not limited to the specific features shown and described and various modified and changed in form and details may be made without departing from the scope of the claims.

What is claimed is:

1. A vehicle warning system comprising:
   a data processor configured to receive a first movement data of a first vehicle and generate a first predicted travel path of the first vehicle in an electronic map database, the first movement data includes a first movement speed of the first vehicle;

an image processor configured to receive an image captured from a video of one of a plurality of video devices installed in a predetermined area where the first predicted travel path passes, a second vehicle and a fixed object are captured in the image, the image processor is configured to generate a second movement data of the second vehicle according to the image, the second movement data includes a second movement speed of the second vehicle, the data processor is configured to receive the second movement data of the second vehicle and generate a second predicted travel path of the second vehicle in the electronic map database; and an estimation unit configured to receive the first and second predicted travel paths, estimate whether the first and second predicted travel paths are intersected and estimate whether the first vehicle moving in the first movement speed along the first predicted travel path will collide with the second vehicle moving in the second movement speed along the second predicted travel path while the first and second predicted travel paths are estimated to be intersected, wherein the image processor includes a conversion module which is configured to convert the image to an aerial view, the image processor is configured to select an aerial photo corresponding to the image from an aerial photo database, the fixed object is shown in the aerial photo, a coordinate set of the fixed object is derived from the aerial photo database and is embedded in the aerial view by the image processor, the image processor is configured to compute a second position coordinate of the second vehicle in the aerial view to generate the second movement data of the second vehicle using the coordinate set.

2. The vehicle warning system in accordance with claim 1, wherein the first movement data further includes a first movement direction of the first vehicle, the first movement direction is configured to be changed with a first turning angle of the first vehicle, the first movement direction or the first turning angel is configured to be obtained according to a first position coordinate of the first vehicle, the first position coordinate is configured to be generated by a positioning system, the data processor is configured to generate the first predicted travel path according to the first movement direction of the first vehicle.

3. The vehicle warning system in accordance with claim 1, wherein the coordinate set includes a first coordinate corresponding to a first end of the fixed object and a second coordinate corresponding to a second end of the fixed object, there are a moving dot representing the second vehicle, a first fix dot representing the first end of the fixed object and a second dot representing the second end of the fixed object are shown in the aerial view, the image processor is configured to record the first and second coordinates at the first and second fix dots in the aerial view respectively, the image processor is configured to compute a first distance between the first and second ends of the fixed object shown in the aerial photo according to pixels of the aerial photo and compute a second distance from the moving dot to one of the first and second fix dots in the aerial view to generate the second position coordinate of the second vehicle.

4. The vehicle warning system in accordance with claim 1, wherein the second movement data further includes a second movement direction of the second vehicle, the second movement direction is configured to be changed with a second turning angle of the second vehicle, the second movement direction or the second turning angel is configured to be obtained according to the second position coordinate of the second vehicle, the data processor is configured to generate the second predicted travel path according to the second movement direction of the second vehicle.

5. The vehicle warning system in accordance with claim 3, wherein the data processor is configured to calculate the second movement speed of the second vehicle using the second position coordinate of the second vehicle and one of the first and second coordinates.

6. The vehicle warning system in accordance with claim 5, wherein the estimation unit further includes a compute module which is configured to compute a predicted contact time between the first vehicle moving in the first movement speed along the first predicted travel path and the second vehicle moving in the second movement speed along the second predicted travel path.

7. The vehicle warning system in accordance with claim 6, wherein the compute module is configured to compute a braking distance of the first vehicle in relation to the second vehicle required to stop the first vehicle before the predicted contact time.

8. The vehicle warning system in accordance with claim 1, wherein the image processor includes a identify module which is configured to identify the second vehicle is what type of vehicle.

9. The vehicle warning system in accordance with claim 1, wherein the image processor includes a screening module which is configured to screen the plurality of video devices located within the predetermined area and select the image based on installation positions and directions of the plurality of video devices.

10. The vehicle warning system in accordance with claim 1 further comprising a reporting unit, wherein the reporting unit is configured to send a reporting signal to the first vehicle while the estimation unit estimates the first vehicle will collide with the second vehicle.

11. The vehicle warning system in accordance with claim 10, wherein the reporting unit is configured to stop sending the reporting signal to the first vehicle while the estimation unit estimates the first vehicle will not collide with the second vehicle owing to one of the first movement direction and the first movement speed of the first vehicle and the second movement direction and the second movement speed of the second vehicle is changed.

12. A vehicle warning system comprising:

a data processor configured to receive a first movement data of a first vehicle and generate a first predicted travel path of the first vehicle in an electronic map database, the first movement data includes a first movement speed of the first vehicle;

an image processor configured to receive an image captured from a video of one of a plurality of video devices installed in a predetermined area where the first predicted travel path passes, a second vehicle and a fixed object are captured in the image, the image processor is configured to generate a second movement data of the second vehicle according to the image, the second movement data includes a second movement speed of the second vehicle, the data processor is configured to receive the second movement data of the second vehicle and generate a second predicted travel path of the second vehicle in the electronic map database; and an estimation unit configured to receive the first and second predicted travel paths, estimate whether the first and second predicted travel paths are intersected and estimate whether the first vehicle moving in the first movement speed along the first predicted travel path will collide with the second vehicle moving in the second movement speed along the second predicted travel path while the first and second predicted travel paths are estimated to be intersected,
wherein the image processor includes a screening module which is configured to screen the plurality of video devices located within the predetermined area and select the image based on installation positions and directions of the plurality of video devices.

* * * * *